J. T. Harris.
Disintegrating Mach.
N° 94,411. Patented Aug. 31, 1869.

Witnesses
Henry C. Houston
Wm Franklin Seavey

Inventor
John T Harris
by W H Clifford atty

J.T. Harris.
Disintegrating Mach.
N° 94,411. Patented Aug. 31, 1869.
Fig. 1.
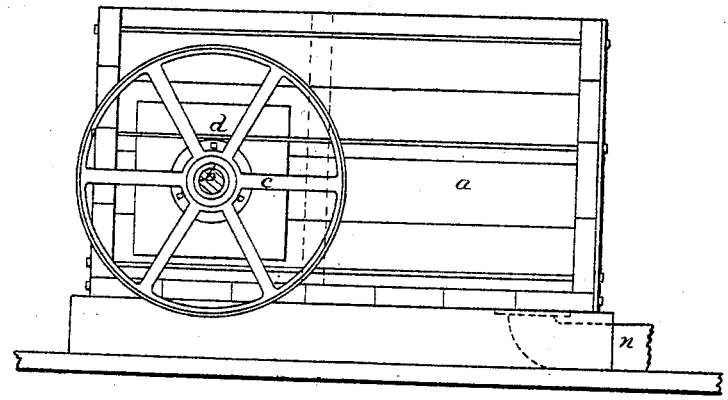
Fig. 2. Fig. 3.
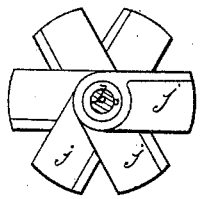 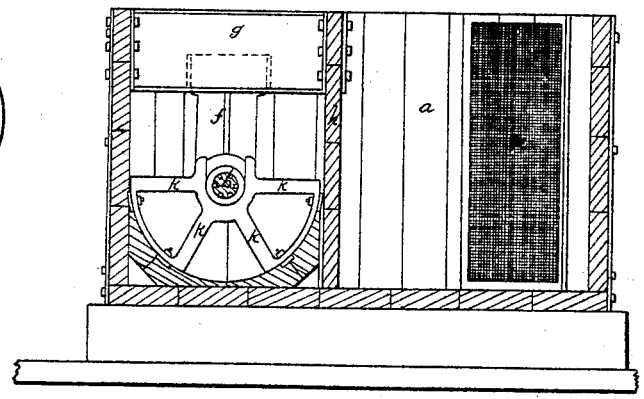
Witnesses
Henry C. Houston.
Wm Franklin Leavey.
Inventor
John T. Harris
Per Wm H. Clifford atty.

J. T. Harris.
Disintegrating Mach.
N° 94,411. Patented Aug. 31, 1869.

Witnesses
Henry C. Houston
Wm Franklin Seavey

Inventor.
John T. Harris
Per Wm T. Clifford atty

J. T. Harris. Sheet 4. 4 Sheets.
Disintegrating Mach.
N° 94,411. Patented Aug. 31, 1869.

Witnesses.
Henry C. Houston
Wm Franklin Seavy

Inventor.
John T. Harris
Per Wm H. Clifford atty.

United States Patent Office.

JOHN T. HARRIS, OF TYNGSBOROUGH, MASSACHUSETTS.

*Letters Patent No. 94,411, dated August 31, 1869.*

---

IMPROVED MODE OF OBTAINING FIBRE AND OTHER PRODUCTS FROM THE MAIZE-PLANT.

---

The Schedule referred to in these Letters Patent and making part of the same.

---

*To all whom it may concern:*

Be it known that I, JOHN T. HARRIS, of Tyngsborough, in the county of Middlesex, and State of Massachusetts, have invented a new and useful improved Process and Machinery for Treating Corn-Stalks, Leaves, &c.; eliminating therefrom the gluten and silica, and leaving the fibre thereof freed from the same, for paper-pulp manufacture; also for leaching or boiling barks, dye-woods, &c., for the purpose of separating the tanning, dyeing, and coloring-extracts therefrom; and I hereby declare the following to be a full, clear, and exact description thereof, which will enable others to make and use my invention, reference being had to the accompanying drawings, forming part of this specification, in which—

Figure 1, plate 1, is a sectional elevation of the cutting and heating-machine.

Figure 2 is a top plan of the same.

Figure 1, plate 2, is an end elevation of the same.

Figure 1:
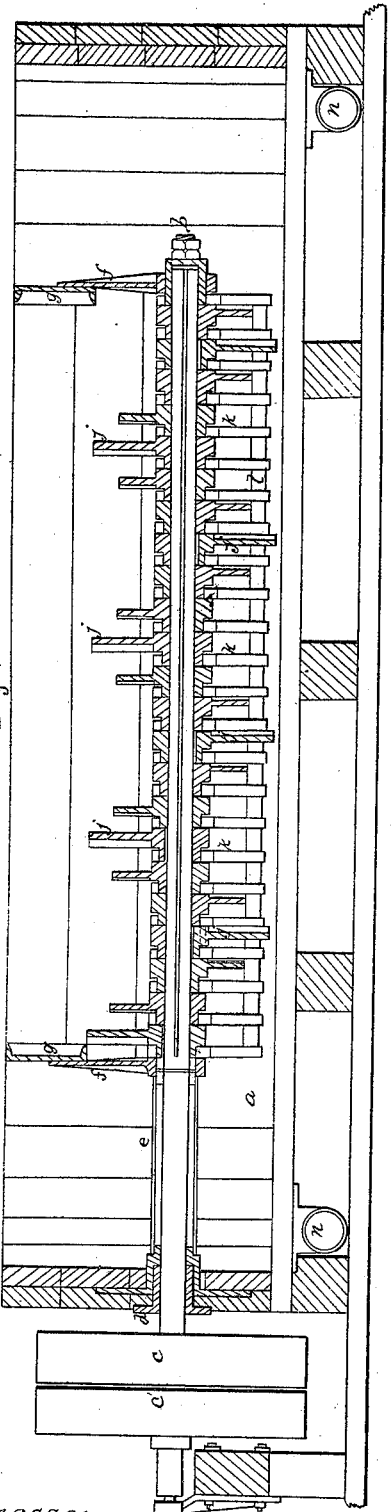

Figure 1, plate 3, is a plan of the bottom of the boilers.

Figure 2:
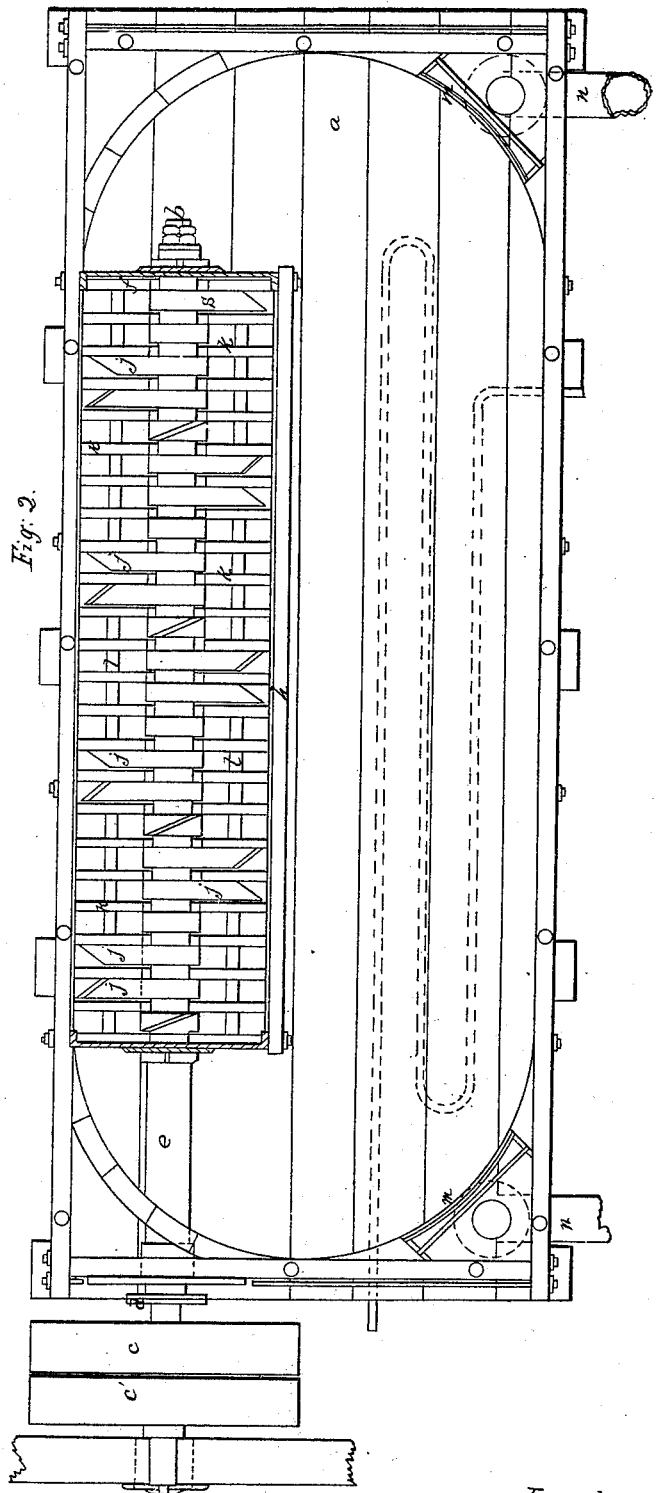
Figure 2 is a detail of the cutting-blades.
Figure 1:
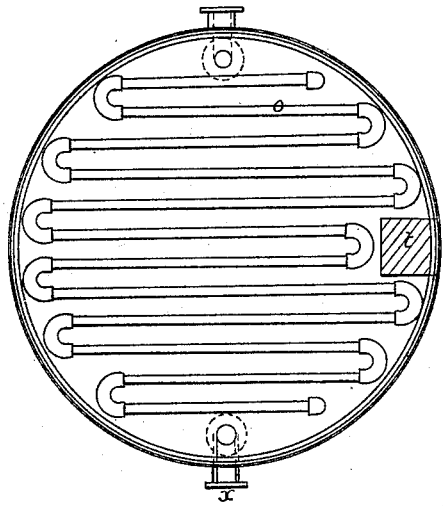
Figure 2:
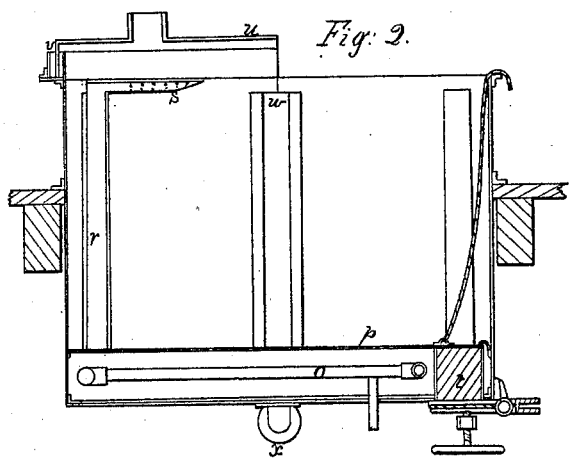

Figure 2 is a sectional elevation of one of the boilers.

Figure 3:
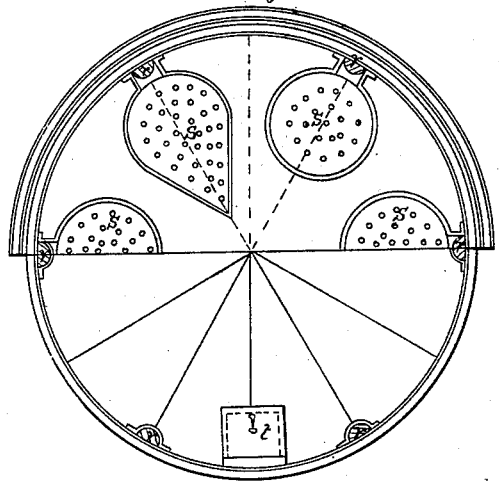
Figure 3 is a sectional end elevation.
Figure 1:
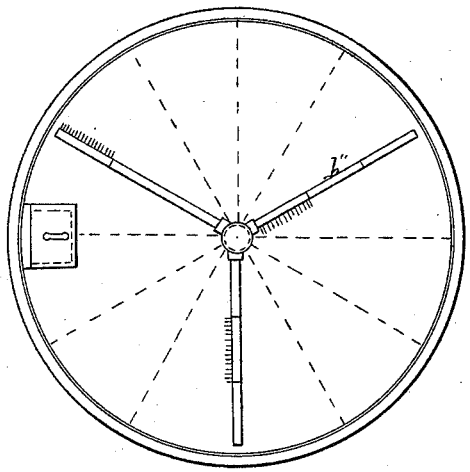
Figure 3:
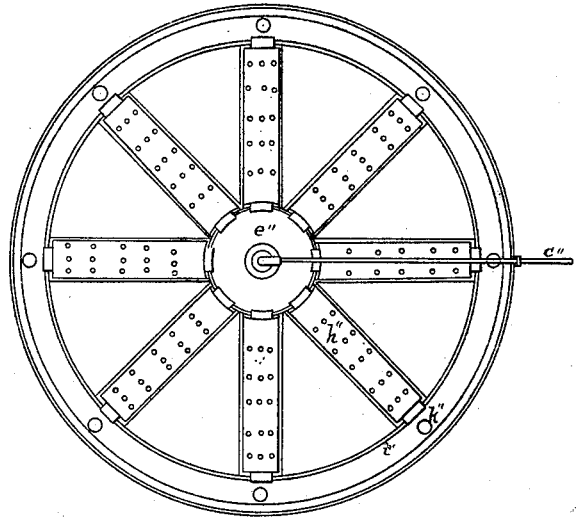
Figure 2:
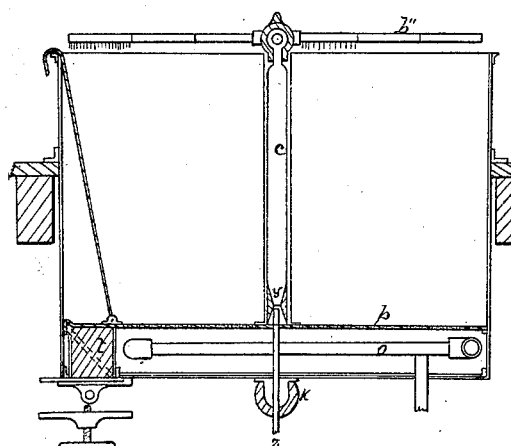

Figure 3 is a top plan of the same.

Figure 1, plate 4, is a top plan of a boiler, showing the sparge-pipe.

Figure 2 is a sectional elevation of the same, showing the steam cone.

Figure 3 is a top plan of a boiler, showing water-lute and scum-ring, and a modification in form of the strainers shown in fig. 3, plate 3.

Figure 4:
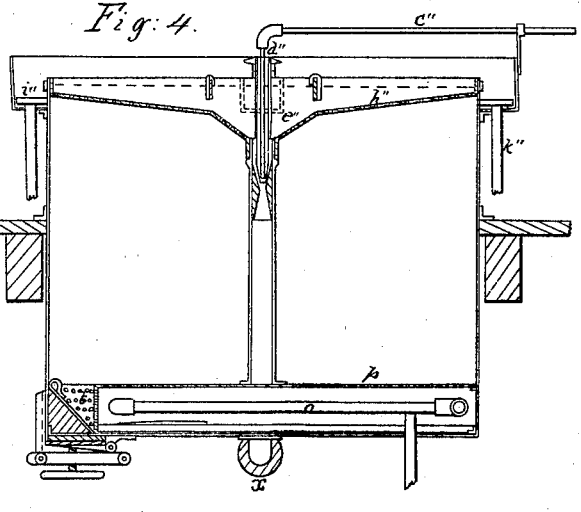

Figure 4 is a sectional elevation of the same, and showing steam and air-cone at top of central tube.

My invention has relation to a new process or method of treating the Indian-corn plant and other fibrous and vegetable substances, for the purpose, first, of disintegrating the same, and, second, for the purpose of removal therefrom of glutinous and silicious matter, and in removing from the fibre matter unnecessary or injurious in the manufacture of paper-pulp; and It consists—

First, in a machine and process for disintegrating the said substances.

Second, in a certain device and process for removing from the said substances glutinous matter.

Third, for promoting circulation in the liquid contents of the boilers, when treating said contents for the elimination of the silex.

My invention also consists in so removing the gluten from the Indian-corn plant that the same can be utilized, and be unaffected by the chemicals employed in eliminating the silex, the stalks, &c., being first treated for the removal of the gluten, and then operated upon for the silex, no chemicals being used for removing the gluten.

I take the Indian corn plant—stalks, leaves, and husks—and crush it, by means of plain or corrugated rollers, or by any mechanical device, and then cut it into short lengths, say from one to three inches, and pass this cut stock, by an endless belt or otherwise, into a large hopper-vat, or receiver, provided with a tapering bottom and outlet-spout, or chute. Into this hopper a jet of steam is introduced, for the purpose of moistening and partially softening the mass of cut plant. When sufficiently moistened, I place it, by the chute or spout, with sufficient water, either hot or cold, to cover it in the pulper, or beating-engine hereinafter described; or a paper-beating engine may be used, supplied with steam-pipes for boiling and such machinery as will assist in disintegrating and reducing the stock under treatment to a pulpy condition.

I boil the contents of the pulper, or beating-engine, if of wood, with steam-heat; if of iron, with either steam or fire-heat.

Reference to the drawings will show that the machine for disintegrating, or, if desired, for washing and bleaching the substance above named, consists of a tank, or vat, *a*, figs. 1 and 2, plate 1, of wood or iron, having all the moving parts thereof mounted on the shaft *b*, extending nearly the whole length, and projecting through one end, as shown in figs. 1 and 2, plate 1, and there receiving the fast and loose pulleys *c c'*.

*d* is a stuffing-box, to prevent the liquid contents of the tank escaping around the journal, or bearing.

*e* is a sleeve, surrounding a portion of the length of the shaft, to prevent any of the material in the tank attaching itself to the shaft when the same is in revolution, and thus accumulating, and impeding the action of the machine.

The middle and inner-end bearings, or journals are of similar construction, and are shown, in figs. 1 and 2, plate 1, to consist of the pendant eye-castings *f f'*, attached to and suspended from the cross-frames *g g'*, in a central position for revolution.

The cross-frames *g g'* are intended to serve as fixtures for the middle partition *h*, fig. 2, plate 1, and fig. 3, plate 2, and to be the means of keeping the same in position.

On that portion of the shaft between the cross-frames *g g'* are mounted the arms *j j j*, &c., for cutting and beating, in form and shape, as shown in fig. 2, plate 1, and fig. 2, plate 2, as a flat blade, set at an angle to the boss which passes over the central shaft *b*, said boss having a fixed key sliding in a suitable groove in the shaft, as shown in fig. 2, plate 2.

There are six of these grooves, at equal distances in the circumference of the shaft, but any number may be used.

One portion of these bosses is smaller in diameter than the rest, and serves as bearing in the jaws of the cutting-frames $k$ $k$, &c., figs. 1 and 2, plate 1, and fig. 3, plate 2.

These cutting-frames are shown as a four-armed open frame, of equal and parallel thickness, attached at equal distances to the bars $l$ $l$ $l$, &c., figs. 1 and 2, plate 1, so as to allow the cutting-blades to pass freely between them, said bars giving a ready means of fastening all the frames to the side and bottom of the tank $a$ and central partition $h$.

The cutting-frames having plane sides, and the blades of the beaters having both edges similar, the shaft can revolve equally well and effectively in either direction.

The material to be employed in the cutting-frames, beaters, and other portions of the machine must be regulated by the nature of the substance under treatment.

Any number of arms can be used in these cutting-frames, and they may be a complete circle, confined in a tube. They may be constructed in various forms, and may also be made with bevel-edged arms, especially designed to cut one way, or the faces of the arms may be reversed to the opposite angle, but all ordinary material can be treated with the arrangement herein shown.

The angular form of the blades of the beaters, and their arrangement upon the shaft, which arrangement forms a broken or interrupted helix, will, when the shaft is in revolution, give motion to the material under treatment, and cause it to travel through the frames and round the ends of the central partition, thus causing it to come repeatedly under the operation of the beaters, &c.

In this revolution, the material passes the wire nettings $m$ $m$, fig. 3, plate 2, which communicate with the waste-pipes $u$ $u$, figs. 1 and 2, plate 1, and fig. 1, plate 2.

Through these pipes the discharge of the liquid contents can be regulated by suitable cocks or valves, and a renewed supply of water for washing can be furnished by any convenient means, or the washing and discharge may be with the ordinary arrangements placed on the common beating-engine.

In the accompanying drawings the shaft $b$ is shown solid, and is the cheapest method of construction, whether circular or of any other form, with four, six, eight, or any number of sides; but it may also be constructed hollow, of any form, with holes to suit corresponding holes in the bosses of the beaters, thus conveying the water, or other liquid required for use, to the place most desirable.

At the extreme end of the shaft $b$, and outside, as shown in figs. 1 and 2, plate 1, is placed a relieving-screw, so that the blades can revolve without any cutting or beating action on the contents of the tank, and, if desired, this can be applied at either or both ends of the shaft.

Steam-pipes may also be placed under a perforated false-bottom in the bottom of the tank, for the purpose of boiling the material under treatment with alkalies, during the operation of disintegration.

Although a tank is described and shown in the drawings, the moving parts of the machine can be placed in a close vessel, of either wood or iron, of any form, or in a boiler, and thus enable the disintegration to be conducted under pressure or *in vacuo*.

The arrangement of this machine is simple and effective, and will complete the disintegration of any fibrous substances subjected to its action, and reduce it to a pulp, ready for conversion into paper.

It has many advantages over the paper-makers' beating-engine now in use for this purpose, and will beat a larger quantity of material daily. It is peculiarly applicable to the treatment of the maize or Indian-corn plant, and spent tan-bark.

The operation is as follows:

When treating maize or Indian-corn plant, it is to be reduced to short lengths, put into a hopper or chamber, and softened by steam or water, or both. It is then placed in the pulper or beater with water, by preference hot, without alkalies, to the depth of the shaft $b$. Steam is then applied to boil the contents, and the moving part of the machinery is put in motion and kept in motion until the contents are thoroughly disintegrated. The waste pipes are then opened, and the whole of the contents run to a vat, and from it to a centrifugal extractor of ordinary form, or a self-discharging one, to be freed from the gluten, and, when so freed, to be conveyed to the boilers for treatment for the removal of the silex, by means of alkaline solutions.

In operating on spent tan-bark, as this is always in small pieces, sufficient quantity is placed in the pulper, and a lime solution is added to the depth of the shaft $b$. Steam is then applied to boil the contents, and the moving parts set in motion and continued in motion until the contents are thoroughly disintegrated. The waste-pipes are then opened and the liquid allowed to escape.

The beaters or blades are thrown out by the releasing-screw at the end of the shaft $b$, to prevent their cutting and beating action. Fresh water is let in, and the machine is kept in motion until the disintegrated fibres are washed and freed from alkali and foreign matter, when they are drawn off to a draining-vat, and, when freed from surplus water, are ready to be converted into paper, if intended for wrapping-paper; or, if for white-paper, they may be bleached in the machine by introducing bleaching-liquor, and, by keeping the moving parts of the machine in motion, the stock will be thoroughly agitated and exposed to the action of the bleach, and by applying steam-heat to the bleach-liquor, the operation will be hastened and rendered more effective.

The cutting-frame may be either horizontal, inclined or vertical.

The blades and cutting-arms may be fixed, and the frame revolve if desired.

The machine may be beneficially employed with rags, spent tan-bark, and other material for paper-pulp, and for washing and bleaching the same, and also for mixing and blending together, or disintegrating herbaceous and farinaceous substances, as, for instance, for cattle-feed.

In the treatment of certain fibrous substances, as, for instance, corn-stalks, husks, &c., but more particularly the stalks, with the view to produce therefrom a pure fibre, experiment has shown, that in order to the profitable employment of the fibre in the manufacture of paper, two elements that enter into the composition of the natural plant must be removed, to wit, the gluten and silica. After the plant has been sufficiently beaten, cut, and disintegrated, and freed from the gluten by the machinery set forth in the foregoing description, I then submit the fibrous portion of the material to the operation of a device and process, as follows, to remove the silex or silica.

These relate mainly to a method for promoting circulation in the liquids in which the fibrous portion of the substance is placed for treatment, causing motion by the difference existing between heated portions, and such as are of lower temperature, in any boiler or receptacle, open or closed, and under pressure, or closed by a simple cover, formed by a water-lute or joint, for the purpose of protecting the contents from atmospheric action.

In fig. 2, plate 4, is shown an arrangement whereby the use of a steam-cone, an induced current is created, and circulation promoted in open boilers, leaches, mash-tubs, &c., and in similar processes, by the force exerted by the action of the steam cone on the liquid contents, forcing them to ascend by the central tube, and then to be discharged and distributed over the solid contents of the boiler, &c., by a revolving sparge-pipe, $b''$.

In figs. 1 and 2, plate 4, is shown an arrangement for promoting the current, applied to open boilers, &c., where the circulation is kept up by the force exerted by the action of a steam-cone on the liquid contents, causing them to descend by a central tube, thus distributing the liquid around and over a steam coil. The liquid then ascends through the substance under treatment to certain collectors, and is by them conveyed to the central tube, to be again forced downward, and so on.

The direction of the currents is indicated by the arrows.

It is well known that in all the operations of boiling or treating vegetables or other fibrous substances, for disintegration and separation of their component parts, (washing or bleaching, the leaching of barks for the extraction of the tanning, dyeing, and coloring-matters, the treatment of log-wood and other dye-woods for the extraction of the coloring-principle; the washing of malt and other grain for breweries and distilleries, used for making beer, porter, spirits, &c., and similar operations,) the circulation of the liquid portion is of great importance, and that any certain mode of insuring such circulation is of great value in such processes and operations.

In the first arrangement, as shown in figs. 1 and 2, plate 3, the circulation is produced by the steam-heated coil $o$, figs. 1 and 2, plate 3, having the usual inlet and outlet connections, and placed in the bottom of the boiler, below a perforated false bottom, $p$; and at the required distances around the outer circumference of the boiler, are placed six, or any other number of pipes or conveyors, $r\ r\ r$, whose bottom-ends shall be open to and through the false bottom, and the top end extending a little below the top edge of the boiler, so as to receive the perforated distributers, of any required form, as shown in figs. 2 and 3, plate 3, by $s\ s$.

The outlet for the contents is shown in figs. 2 and 4, plate 4, and others, at $t$, as a hinged door, with a cross-bar and screw, similar to an ordinary retort door, and at the false bottom a loose plate or cover, attached by a chain or wire-rope, so as to enable it to be pulled through the contents, out to the top, in open boilers.

The object of this inner door is to keep the contents above the false bottom, and thus exposed to the action of the treatment required.

In fig. 2, plate 3, is shown a half-section of a loose cover, at $u$, having a deep flange downward, which is intended to drop into a recess at $v$, partially filled by water, thus forming a water-lute or joint, and closing the boiler from the atmosphere, except the escape-pipe for vapor. This cover and water-lute can be applied to all open boilers if desirable, the object being to confine all vapors, and convey them away by the escape-pipe in any desired direction instead of allowing them free discharge into the building. I know that the water-lute arrangement is in common use as a close seal for covers in gas-works and elsewhere, but I do not know that such arrangement has been used as a means to confine vapor from open boilers, leaches, &c., and with an escape-pipe, or in combination with machinery such as herein described.

The circulation is obtained by the steam-heated coil $o$, although the same effect can be produced by fire-heat, if the vessel is of iron or other metal.

The action of the heat is to cause the fluid to rise up the side-tubes, and discharge itself above the contents of the vessel or boiler, upon and over the same.

The fluid may be distributed by sieves, strainers, or gratings, then descending through the substance under treatment, and the perforated false bottom, it will be acted upon by the heat, and, rendered thus specifically lighter in volume, will reascend by the side-tubes, when there is no obstacle.

Although side-tubes are here shown, a central tube or any number of pipes placed at suitable distances between the centre and sides may be used, either together or separately, as the action is equally certain, either in open vessels, as shown, in closed boilers under pressure, or covered by a loose cover and the water-lute, without any pressure, so long as sufficient heat is applied at the bottom to give the requisite difference of volume to cause the particles of liquid to move by the action of the difference of their specific gravity due to the increase of temperature.

This arrangement is suitable for treating rags, by boiling; to disintegrating vegetable fibrous substances for paper-pulp, where a high temperature is desirable or a pressure required.

The operation is as follows:

The vessel or boiler having been filled to the requisite depth with the substance to be treated, the liquid portion is then added from the top or by the inlet-pipe $w$, fig. 2, plate 3, and the steam is then let into the coil $o$, or fire-heat applied. Under the action of the heat the current begins and continues as long as the heat is applied. The current is slow or rapid according to the temperature.

After the substance under treatment has reached the desired state, the liquid portion is then drawn off by the pipe $x$, figs. 1 and 2, plate 3, &c.

If desired, the outlet door $t$ may be opened, the inner door drawn up, and the contents drained out to wherever required.

In figs. 1 and 2, plate 4, the central pipe rises from the false bottom and rests on it, and at the bottom end is placed, internally, a double cone, $y$, or the cone may be made of any suitable form, to allow the small steam-pipe $z'$ to give the requisite impetus to the liquid.

At the top of the central pipe $a'$ is mounted a sparge-pipe, $b''$, figs. 1 and 2, plate 4, which revolves by the pressure of the liquid forced up from the steam-cone and jet.

I am aware of the patent of M. Nixon, November 22, 1859. My process here is quite different from his. He claims a forced current under heavy pressure. It is contrary to natural laws. Moreover, I employ the cones and air, of which Nixon's patent does not speak. The air could not be employed under heavy pressure as I employ it.

The operation for fibrous substances or bleaching is substantially the same as before, with the exception of the induced current and the distribution of the liquid by the sparge-pipe. But in leaching, as in hemlock bark for tanners' use, this induced circulation becomes very valuable.

Usually the sparge-pipe, for distribution of the water or liquor, is mounted on a pivot, or otherwise, and fed from the top, and from its peculiar arrangement of holes in the sides of the hollow arms, is made to revolve by the force exerted in the discharge of the fluid from these holes, such force being due to the descent of the fluid from an elevated supply-cistern at any suitable height to give the pressure required; and when such water or liquor has passed through the contents of the leach, it is drawn off below, either for use, or if not sufficiently impregnated, is returned above by pumps, or other machinery, losing heat in its passage, to the supply-cistern, to be again passed through the contents of the leach.

By my arrangement, applied to any ordinary leach in use, and fitted with a sparge-pipe, by providing a perforated false bottom, if there is not one already in the leach, and placing the central pipe upright, passing it through the false bottom, and having slits or holes, for the passage of the liquid to the interior, up and through the steam-cone to the sparge-pipe, mounted in any suitable manner on the top, so as to freely revolve, the action of the forced current on the arms, if suitably perforated, will be the same as a pressure-current from a supply-cistern.

I prefer a pipe with three arms, instead of two, each arm being perforated but a portion of its length, and the whole length of the three sets of perforations being equal to the length of one arm. By such means, I secure a more perfect distribution of the liquid. This is also aided by varying the size of the holes according to the distance the segments have to travel in revolution. I prefer to employ the cover with escape-pipe and water-lute in each, particularly when a substance containing tannin is treated.

In figs. 3 and 4, plate 4, the cone or contraction of the interior of the pipe is at the top, as is also the service-pipe $c''$.

Around the steam-pipe is placed an air-cone, having openings at $d''$, fig. 4, plate 4, which openings are opened or closed by a sleeve, having corresponding openings, but with intermediate spaces enough to close the apertures in said pipe by the partial turning of the casing.

On the top of the central pipe, and slipping over the outside of the same, is the collector $e''$, having any number of square-bottomed arms, $h''$, figs. 3 and 4, plate 4, extending to the periphery of the boiler.

The bottoms only of these collectors are perforated, the sides being made to rise some inches above the top edge of the boiler, so that scum arising from the processes of boiling may be carried off over the sides of the boiler, flowing into the scum-ring $i''$, figs. 3 and 4, plate 4, and passing by the waste-pipes $k''$ to wherever required, the sides of the collectors preventing the scum from passing into them, and the clear liquor only being admitted through the bottoms, to be returned by the action of the steam-jet and cone to the space in and around the steam-coil, being there reheated, and ascending through the contents, bringing with it any foreign matters, to be discharged over the sides into the scum-ring as waste, if not desirable that the same should be collected.

The cover, with escape-pipe and water-lute, or joint, can be added to this boiler, if desired, and the heat used both in this and the last-described boiler may be fire-heat, instead of steam.

This device will be valuable in treating fibrous vegetable substances for paper-makers' use, and in bleaching the same.

The purpose of the air-cone is, that in boiling, the air will open up the stock freely, and bring every portion to the action of the liquid. The pressure of the steam will force the alkali used into contact with every particle of the stock under treatment, thus saving alkali, and insuring action on all parts of the stock.

In bleaching, the action of the oxygen in the atmosphere is very favorable, in combination with the steam and any of the ordinary bleaching-preparations. The whole arrangement can be used as a bleacher, with advantage, by taking out the steam-coil.

In this arrangement, when filling the boiler, if a small portion of steam is passed through the stock, the air will be expelled, and the operation of packing facilitated by the softening of the stock, such as straw, grass, &c., thus increasing the capacity of the boiler.

I do not claim circulation by the difference of specific gravity, caused by heat, that being one of the laws of nature; neither do I claim a sparge-pipe, as that is old and well known; neither do I claim the application of a jet of steam to produce motion in fluids, which is equally old, and in use in various ways; nor the water-lute, except as in combination with the machinery, and for the special uses herein defined.

It should be remarked, that in the treatment herein described, of the Indian-corn plant, for the production of fibre therefrom for paper-pulp, the glutinous element therein is first removed, without the employment of chemicals, leaving only the silica to be subsequently eliminated by the processes herein described.

This is an important and essential feature in my invention, inasmuch as, by my process, the gluten is first removed and kept free from chemicals, and is in the best state for cattle-food, or any other purpose. There is no loss in chemicals by admixture with the gluten, nor is there anything left on the fibrous portion but the silica, ready to be acted upon by the chemicals, when put into the boilers. Heretofore, the plant has been submitted to the operation of chemicals before the gluten has been extracted.

This is, first, very expensive, and secondly, the process is imperfect and unsatisfactory in its results, as shown by the character and quality of the paper manufactured from the fibre when thus treated, a portion of the gluten inevitably remaining with the fibre, and producing a hard or glazed surface on the paper, and thus impairing its usefulness, and being very destructive to the type.

After the fibrous portion has been freed from the silica, in the boilers, by the application of alkali, the fibre is again placed in the centrifugal extractor, for the purpose of removing therefrom the alkali used in extracting the silex. This operation may be conducted by the employment of either hot or cold water.

When the washing is complete, the fibre is ready for bleaching, if white paper is to be the manufacture; if brown paper, it is ready for the paper-makers' beating-engine.

Paper has before been made from the maize or Indian-corn plant, but not profitably, owing to the large quantity of chemicals used in reducing the plant, on account of the abundance of silex in it, and the destruction of the gluten and saccharine-matter by the chemicals, which gluten, by first extracting the same, I save and utilize.

I do not, of course, claim the centrifugal extractor, but specify it as one of the steps of my process.

What I claim as my invention, and desire to secure by Letters Patent, is—

1. The cutting-frame, fixed or revolving, or other frames or arms, either of plain or grooved faces, and whether a portion of a circle or a whole circle, either horizontal, vertical, or at any angle, as and for the purposes herein described.

2. The blades or cutting-arms, revolving as shown, or fixed, and other arms or frames, revolving in contact with them, either horizontal, vertical, or at any angle, as and for the purposes herein described.

3. The relieving-screw, in combination with the shaft $b$, at one or both ends, as and for the purposes herein described.

4. The combination of the whole machine, substantially as herein described, for the purposes hereinbefore stated.

5. The apparatus, as shown in figs. 1, 2, and 3, plate 3, to operate as herein described, and for the purposes set forth.

6. The apparatus, as shown in figs. 3 and 4, plate 4, to operate as herein described, and for the purposes set forth.

7. The arrangement of the central pipe $a'$, as in figs. 1 and 2, plate 4, with its steam-jet and cone, to operate substantially as and for the purposes herein set forth.

8. The apparatus in the form shown in figs. 3 and 4, plate 4, with its central tube, steam-jet and cone, and with or without the air-cone, and with its collectors, scum-ring, &c., substantially as and for the purposes herein described.

9. The collectors $e''$ $h''$, figs. 3 and 4, plate 4, substantially as and for the purposes herein described.

10. The arrangement of the scum-ring $i''$, figs. 3 and 4, plate 4, substantially as and for the purposes herein described.

11. The cover, with its escape-pipe $u$, and water-lute or joint $v$, as shown in figs. 2 and 3, plate 3, and fig. 4, plate 4, combined, arranged, and to operate as herein set forth.

12. The creating of a forced-upward current or circulation in the liquid, by means of the steam-jet and cone, in one central, or any convenient number of tubes, either within or without the boiler or vessel, substantially as and for the purposes herein described.

13. Creating a forced-downward current, by means of the steam-jet and cone, as herein shown in figs. 2, 3, and 4, plate 4, and either with or without the air-cone, in one central, or any number of tubes, substantially as and for the purposes herein described.

14. Treating the maize or Indian-corn plant so as to extract, first, the glutenous and saccharine matter, and then the silica, substantially as and for the purposes herein described.

15. Treating the fibres from the said plant with alkali, after the said fibre has been separated from the gluten and saccharine matter, substantially as herein set forth.

JOHN T. HARRIS.

Witnesses:
WM. FRANKLIN SEAVEY,
WM. HENRY CLIFFORD.